Oct. 21, 1941. C. VOORHIES ET AL Re. 21,931

TAPPET CONSTRUCTION

Original Filed Aug. 3, 1936 2 Sheets-Sheet 1

INVENTORS.
Carl Voorhies,
Harry E. Voorhies.
BY
Harness, Dickey, Pierce & Hann.
ATTORNEYS.

Oct. 21, 1941. C. VOORHIES ET AL Re. 21,931

TAPPET CONSTRUCTION

Original Filed Aug. 3, 1936 2 Sheets-Sheet 2

INVENTORS.
Carl Voorhies,
Harry E. Voorhies.
BY
Harness, Dickey, Pierce & Mann.
ATTORNEYS.

Reissued Oct. 21, 1941

Re. 21,931

UNITED STATES PATENT OFFICE 21,931

TAPPET CONSTRUCTION

Carl Voorhies, Detroit, and Harry E. Voorhies, Grosse Pointe, Mich., assignors, by mesne assignments, to Eaton Manufacturing Company, Cleveland, Ohio, a corporation of Ohio Original No. 2,185,991, dated January 2, 1940, Serial No. 94,040, August 3, 1936. Application for reissue June 25, 1941, Serial No. 399,690

25 Claims. (Cl. 123—90)

This invention relates to automatic compensating tappets for operating such parts as intake or exhaust valves of internal combustion engines, and more especially relates to improvements in the construction and arrangement of tappets of such character.

The principal object of the invention is to improve the automatic compensating mechanism of tappets especially adapted for operating movable parts of internal combustion engines.

Another object is to provide in a device of the above character a novel check valve construction and arrangement of such nature that the check valve means is closed by a force substantially equal to the force exerted by the engine valve operating gear when the engine valve is open.

A further object is to provide a novel plunger construction for hydraulic compensating tappets which includes means providing a seal between the plunger and its cylinder, and an inlet port and a check valve means for the hydraulic compensating chamber of the tappet.

It is also an object of the invention to provide for uniform rate of leakage from the hydraulic compression chamber of the tappet and to employ a single element adapted to abut a plain surface for controlling such lead-down rates so that a single element may be accurately manufactured by coining or stamping process.

Another object is to provide a system of construction which obviates the necessity of selective or other accurate fitting of plunger parts with respect to the cylinder therefor.

A still further object of the invention is to provide, in a tappet construction including a cylindrical bore and a plunger arranged therein, means for causing a lagging or retardation of the movement of the piston forming means relative to its cylinder under certain conditions of operation.

Another object is to provide, in a tappet construction, including a cylindrical body and a plunger arranged therein for defining in conjunction with said cylindrical body a hydraulic compression chamber, means for effecting a substantially complete seal between said plunger and cylindrical body, and means for permitting a definite and predetermined leakage or escape of liquid from said hydraulic compression chamber.

Other objects, features and advantages will become apparent from the following description and appended drawings.

For the purpose of illustrating the genus of the invention, typical concrete embodiments are shown in the accompanying drawings in which:

Fig. 1 is a central vertical section of a tappet construction according to this invention;

Figs. 2 and 3 are transverse sections taken substantially on the lines 2—2 and 3—3 of Fig. 1;

Figure 1:
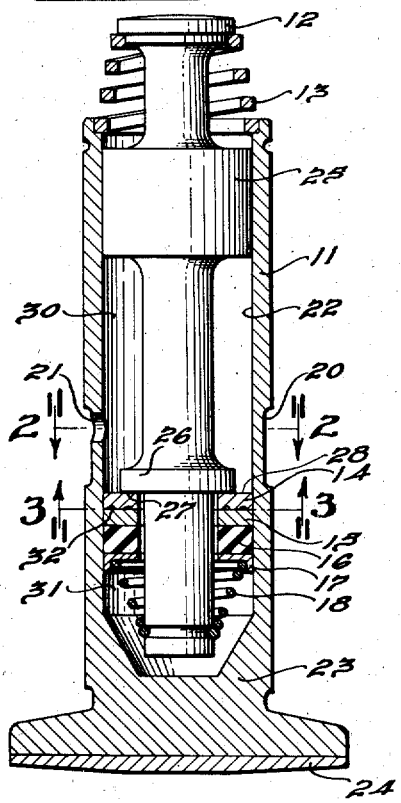
Figure 2:
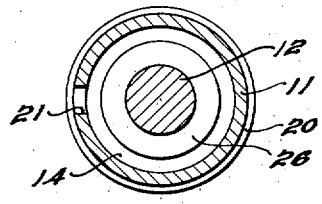
Figure 3:
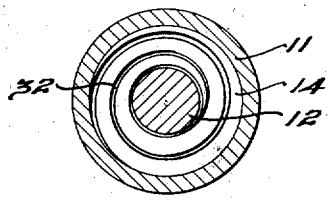

Referring to the drawings wherein like numerals are applied to like parts in the several views, and referring more especially to Figs. 1, 2 and 3, there is shown a hydraulic compensating tappet construction comprising a cylindrical body 11, a plunger 12, a plunger spring 13, a coined or grooved valve 14 in the form of a washer, a plain or flat washer 15, an elastic but substantially incompressible washer or similar packing element 16. In the above washer-like elements 14, 15 and 16 are preferably, although not necessarily, maintained in position on a plunger means 12 by means of a packing retainer washer 17 and a packing spring 18.

The tappet body 11 is provided with an annular recess 20 and one or more liquid admission ports 21 leading therefrom to the longitudinal bore 22 of the tappet body 11. Liquid may be admitted through the recess 20 and port or ports 21 into the longitudinal bore 22, from a suitable source of liquid supply, such as a lubricating system of an internal combustion engine. The lower end of the tappet body 11 is closed as indicated at 23 and is preferably provided with a hard wear-piece 24 adapted to engage the operating cam for an exhaust or intake valve of an internal combustion engine. The upper end of the cylindrical tappet body 11 is open for the reception of the plunger 12 and the latter is provided with a cylindrical portion 25 adapted to make a free sliding fit within the bore 22. The cylindrical portion 25 is provided primarily for guiding purposes. The spring 18 is arranged in a slightly compressed condition between the outer headed end of the plunger 12 and the upper open end of the tappet body 11 for urging the plunger 12 outwardly with respect to the bottom of the bore 22. The plunger 12 is provided with an annular flange 26, the lower face of which, indicated at 27, is substantially normal to the axis of the plunger 12. The upper surface 28 of washer 15 is also a plain surface and the cooperating surfaces 27 of flanges 26 and 28 of washer 14 are both machined and polished so that when the washer is pressed upwardly by any material force leakage between the flange 26 and washer 14 is prevented.

Figure 4:
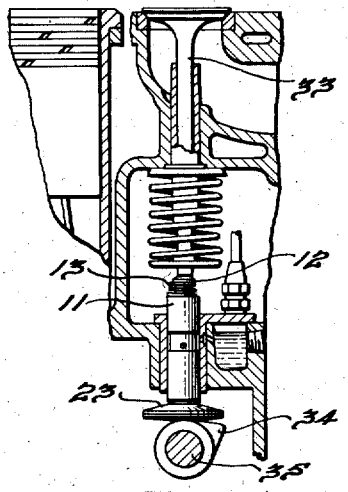
Fig. 4 is a section showing a portion of an internal combustion engine and showing a tappet such as illustrated in Figs. 1 and 3 interposed between the valve operating cam and a spring seated intake or exhaust valve.

The space 30 within the bore 22 of the tappet body 11, between the cylindrical portion 25 of plunger 12 and the valve member or washer 14 constitutes a preliminary or reserved liquid supply chamber for the tappet. The space within the bore 22 of tappet body 11 between the valve member or washer 14 and the bottom of the bore 22 constitutes the hydraulic compression chamber 31 of the tappet. Expansion of the spring 13 tends to cause the plunger 12 to move outwardly with reference to the tappet body until the end of the plunger 12 contacts the end of the valve 33, as indicated in Fig. 4, and to cause end 23 of tappet body 11 to contact the valve operating cam, or the upper end of the plunger 12 and the lower end of the tappet body 11 contact other parts of valve operating mechanism. Outward movement of the plunger with reference to the tappet body creates a partial vacuum condition within the compression chamber 31 and causes the upper surface 28 of the valve member of washer 14 to separate from the surface 27 of flange 26 and permits flow of liquid from the preliminary or reserved chamber 30 to the hydraulic compression chamber 31 until the latter chamber is filled with liquid and the pressure becomes substantially equalized between the chambers 30 and 31.

The lower face of the valve member or washer 14 is provided with a spiral groove 32 leading from its interior periphery to its outer periphery as indicated in Figs. 1 and 3. In actual practice this groove is of very small dimensions, and may be of other form than spiral where the desired resistance to flow can be obtained. The spiralling or otherwise lengthening of the groove 32 permits the same to be of sufficient length to afford the desired resistance to flow of liquid from the interior to the outer periphery of the valve member and still permit the groove 32 to be formed by mechanical processes with a desired accuracy so that a definite cross-sectional area and length of groove 32 may be had. This enables commercial production of grooved washers or valve members by coining or stamping processes so that definite leak-down rates can be obtained for large numbers of tappets with a result that uniform operation of all of the tappets will be obtained. The washer 15 is preferably composed of metal and has its upper and lower surfaces plain and parallel, and these surfaces are machined and polished so that undesired or inadvertent leakage between the surfaces thereof and the surfaces with which they cooperate will not occur. The upper surface of the washer 15 cooperates with the grooved surface of the valve member of washer 14 so that the groove 32 provides a small cross-section passage preferably of extended length, the cross-sectional area and length of this passage 32 being uniform for all tappets of the same type produced.

Figure 9:
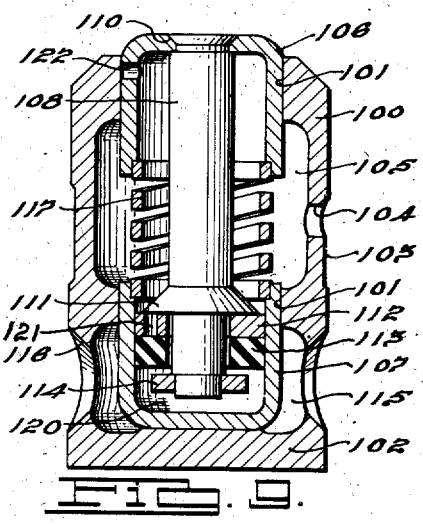

The washer 16 is preferably composed of a synthetic rubber or other elastic and substantially incompressible material, or may be formed of a soft metal such as lead or soft alloys. The inner and outer peripheries of the washer or packing element 16 are preferably substantially of the same dimensions as the washer elements 14 and 15. The thickness of the washer 16, however, may be greater than that of either of the washers 14 or 15. If desired, a downwardly flanged packing washer 17 having substantially the same inner and outer peripheral dimensions as the preceding washer-like elements and a light packing spring 18 may be employed for retaining the elastic packing washer 16, washer 15 and valve member 14 in position. The spring 18 is very light so that any material difference in pressure between the preliminary chamber 30 and the hydraulic compression chamber 31 will allow admission of liquid between the cooperating surfaces 27 and 28 of the flange 26 on plunger 12 and the valve member 14, provided the lesser pressure occurs in the hydraulic compression chamber 31. The spring 18 and packing washer 17 may be omitted as illustrated in Fig. 9, later to be described.

During operation the tappet illustrated in Fig. 1, is interposed in a valve operating mechanism in the manner indicated in Fig. 4. Oil may be admitted through the annular recess 20 and ports 21 to the preliminary or reserve chamber 30, from the conventional lubricating system of the internal combustion engine. Plunger spring 13 holds the upper end of plunger 12 against the valve stem, or an operating part therefor, and the closed end 23 of the tappet body against the cam shaft, or part operated thereby. When the plunger spring 13 causes outward movement of the plunger with reference to the tappet body a partial vacuum condition will be created within the hydraulic compression chamber 31 and the valve member 14 will not be held in tight engagement with the shoulder 26 on plunger 12. Oil then flows between the cooperating surfaces 27 and 28 of the flange 26 on plunger 12 and the valve member 14 from the preliminary chamber 30 to the hydraulic compression chamber 31. When the pressures are substantially equal in the chambers 30 and 31, the washer or valve element 14 will be brought into contact with the surface 27 of flange 26 by the action of the light packing spring 18. As the cam shaft lifts the tappet body, the pressure of the oil in the hydraulic compression chamber 31 is increased on two faces of the packing element 16, the inner peripheral surface and the lower surface of the packing element 16, and will force the packing element against the wall of the bore 22 of the tappet body and against the washer 15. The expansion of the packing element 16 against the wall of the bore 22 of tappet body 11 will effect a seal between the packing element and the tappet body, and the pressure of the sealing element against the washer 15 will effect a seal between these elements. This upward pressure is transmitted to the washer 15 forcing the latter into tight engagement with the valve member 14 so that no leakage can occur from the inner periphery of the valve member 14 to the outer periphery thereof except such leakage as is allowed by the spiral groove 32. This upward pressure likewise forces the smooth plain upper face 28 of the valve 14 against the corresponding face 27 on the flange 26 of plunger 12. Since the valve member 14 is pressed against the flange 26 by a force substantially equal to the entire load of the valve gear at the time of opening of the engine valve, a seal between the valve member 14 and flange 26 is effected. When the engine valve is in closed position the pressure holding the valve member 14 against the shoulder 26 is released so that oil can seep between the surfaces of the washer elements 14 and 15 and between the valve member 14 and the shoulder 26 so that a cleaning cycle is provided. The spiral groove 32, due to its added length, may be used to provide for proper control of the leak-down rate of oil from the hydraulic compression chamber to the reserve supply chamber 30 without having the cross-sectional area of the groove too small for manufacturing purposes. During lift of the engine valve the grooved face of the valve member 14 is pressed against the flat smooth face of the washer 15 by a force substantially equal to the entire load of the valve operating mechanism. In this manner, the engine valve will be elevated without appreciable lift loss except that provided for by the groove 32 which controls the leak-down rate of oil flow between the hydraulic compression chamber 31 and the preliminary or reserve chamber 30.

As previously indicated the packing element or washer 16 is preferably composed of synthetic rubber, or other elastic but substantially incompressible material or expandable metal or alloy. The clearance between the inner periphery of the packing element 16 and the cylindrical portion of the plunger 12 surrounded thereby, is perferably quite small so that the packing element 16 is maintained in a substantially confined condition between the plunger 12, the washer 15, the wall of bore 22 of tappet body 11 and the packing washer 17 on the oil within the hydraulic compression chamber 31.

With the packing washer in substantially confined condition, elevation of the tappet by the operating cam shaft therefor will increase the pressure within the hydraulic compression chamber 31 and cause the packing element 16 to radially expand and effect a complete seal with the wall of the bore 22 of the tappet body 11, thereby to prevent possible leakage of oil from the compression chamber 31 past the packing element 16. The radial expansion of the packing element 16 thus occurring will, of course, increase its frictional engagement with the wall of the bore 22 tending to retard the downward movement of the plunger 12 in the bore 22 under leak down conditions, but such frictional drag will be insignificant as compared to the load required to be transmitted by the tappet in holding the valve open and which load is carried by the oil in the compression chamber 31. However, occasions do arise where a valve in seating bounces off of its seat, and under such conditions if both the plunger 12 and the packing element 16 were free to follow the valve upwardly under the influence of the spring 13 when thus bounced, it will be appreciated that the resulting increase in volume of oil in the compression chamber 31 would soon cause the tappet to become elongated to such an extent as to hold the valve off its seat at all times. With the construction herein provided should the valve thus bounce off of its seat during its closing movement, the plunger 12 would be free under the influence of the spring 13 to follow the valve. Under such conditions the spring 18 would, of course, tend to move the sealing element 16 and its associated washers 14, 15 and 17 upwardly with the plunger but because of the friction exerted between the packing element 13 and the wall of the bore 22 such friction would cause a lagging or retardation of any movement of the packing element 16 and its associated washers in the direction of movement of the plunger 12, the spring 18 being relatively light and being compressed under such conditions. The lagging of the element 16 is preferably such that very little if any movement of the same would occur between the time the valve thus bounces and again seats. In this connection it will be appreciated that particularly where the packing element 16 is formed of rubber-like or equivalent flexible material the pressure of the spring 18 under the conditions above assumed will tend to expand the element 16 into frictional engagement with the bore 22 and thus increase its frictional engagement therewith to enhance the retardation or lagging effect. It will be appreciated that while it is relatively easy to pull a rubber element through a bore it is relatively difficult to push it through a bore and this effect in the present case occurs under the conditions assumed. For the above reasons, with the particular construction shown and described, an exceptionally efficient seal is provided between the plunger and the wall of the bore while the tappet is carrying the load of the valve and at the same time the element 16 exerts a sufficient drag or retarding movement on the upward movement of the sealing element 16 and associated washers under the influence of the spring 18 to eliminate the disadvantages which might otherwise occur when the associated valve bounces from its seat.

Reference may now be had to Fig. 4 which illustrates a tappet of the construction described relative to Fig. 1, interposed between a valve 33 of an internal combustion engine and an operating cam 34 fixed to cam shaft 35. The operation of this arrangement will be clear from the above description of the construction shown in Fig. 1.

Figure 5:
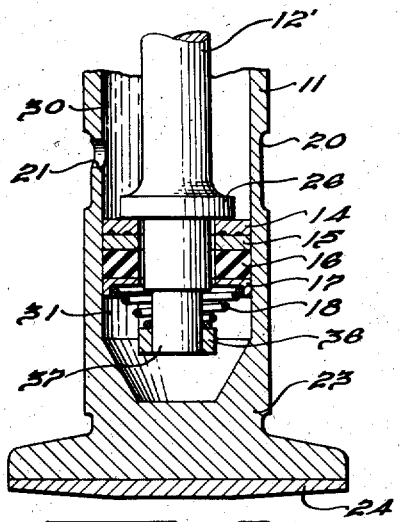
Fig. 5 is a fragmentary view similar to Fig. 1 of a portion of a modified form of tappet construction; and, Figs. 6, 7, 8 and 9 are views similar to Fig. 1 of other modified forms of tappets constructed according to the principles of this invention.

Referring to Fig. 5, a construction very similar to that disclosed in Fig. 1 is illustrated. In this construction the only modification is in the plunger 12′ and relates to the manner in which the lower end of the packing spring 18 is connected to the plunger. In the construction shown in Fig. 5 an element 36 is press fitted upon the reduced end 37 of plunger 12′ in order to retain the lower end of packing spring 18 connected to the plunger 12′ instead of clipped in a groove in the lower end of the plunger in the manner illustrated in Fig. 1. This construction, like that shown in Fig. 1, provides a resilient packing element 16 of substantially incompressible material adapted to be forced into sealing contact with the wall of the bore of the tappet body 11 upon the occurrence of increased pressure in the hydraulic compression chamber 31 for substantially sealing the plunger 12′ with respect to the tappet body 11. Such increased pressures also cause the packing element 16 to be forced into sealing engagement with the washer 15 and the valve member 14 to effect a seal with the flange 26 of plunger 12′. The coined or grooved lower surface of valve member 14 and the upper surface of the washer 15 are also brought into contact so that the spiral groove in the lower face of valve member 14 affords means for allowing only a definite and predetermined leakage or escape of oil from the hydraulic compression chamber 31. The construction of the remaining elements and their arrangement is the same as that illustrated in Fig. 1.

Figure 6:
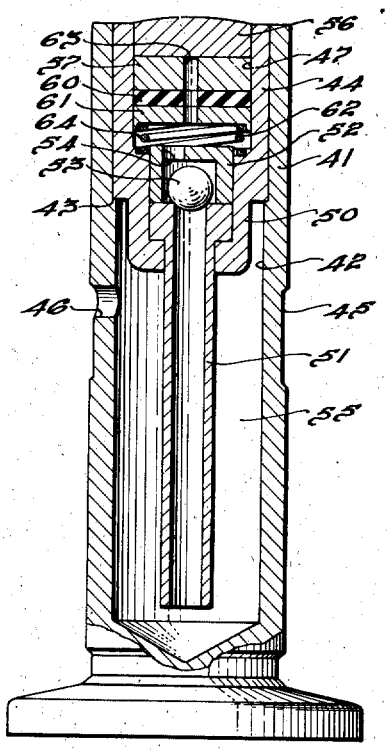

Reference may now be had to Fig. 6 which illustrates a modified form of tappet construction embodying the principles of the present invention, this construction including a cylindrical tappet body 41 provided with a bore 42, which affords the shoulder 43 for supporting a separate cylinder 44 adapted to be received within the upper end of the bore 42.

The tappet body 41 is provided with an annular recess 45 and an admission port 46 and is otherwise of substantially the same construction as that disclosed in the embodiment showing in Figs. 1 and 5. The separate cylinder 44 is provided with a cylindrical bore 47 and a reduced and bored boss portion 50 in which has been press fitted a suction tube 51 and a valve retaining cage 52. A ball check valve 53 is disposed within the cage 52 for limited movement therein and is adapted to make a fine line contact with the upper end of the bore of suction tube 51, so that the upper end of the bore wall of tube 51 forms the valve seat for the return valve 53. The upper end of the cage 52 is provided with an oil passage 54. The separate cylinder 44 preferably makes a drop or sliding fit within the upper end of the bore 42 so that air may be vented from the preliminary or reserve liquid supply chamber 55 formed by that part of the bore 42 which lies below the separate cylinder 44. The tappet plunger 56 makes a loose or sliding fit within the bore 47 of separate cylinder 44. A cylindrical washer member 57 makes a similar fit within the bore 47 of separate cylinder 44 and is arranged within the latter bore immediately below the plunger 56. An elastic packing washer 60 and a packing retainer washer 61 are arranged within the bore 47 below the plunger 56 and washer 57 in the order named. A coil spring 62 is interposed between the boss portion 50 of separate cylinder 44 and the packing retainer washer 61 for extending the plunger 56 outwardly with reference to the separate cylinder until the upper end of the plunger contacts one element of a valve operated gear while the closed end of the tappet body contacts another.

An axial passage 63 extends upwardly through the packing retainer washer 61, the elastic packing washer 60 and washer 57. That portion of the bore 47 of separate cylinder above the non-returning valve 53 and below the washer elements 57, 60 and 61 constitutes the hydraulic compression chamber 64 of the tappet.

During operation of this tappet construction, oil or other liquid under pressure is admitted through the annular recess 45 and port 46 to the preliminary or reserve supply chamber 55. The plunger spring 62 causes extension of plunger 56 until the latter contacts one valve operating part and the closed end of the tappet body 41 contacts another valve operating part. Outward movement of the plunger 56 creates a partial vacuum condition within the hydraulic compression chamber 64 causing the valve 53 to lift from its seat and liquid medium to be drawn upwardly through the suction tube 51 into the hydraulic compression chamber 64 of the tappet. When an engine valve is lifted by the tappet, the increased pressure within the hydraulic compression chamber 64 is exerted upon the inner periphery of the elastic but substantially incompressible packing element 60 and upon the lower surface of the latter, causing the material of the packing to flow outwardly and provide a seal between the packing and the bore 47 of the separate cylinder 44. The increased pressure exerted by the liquid medium within the hydraulic compression chamber causes the adjacent surfaces of washer 57 and the elastic packing element 60 to be pressed together and the upper surface of washer 57 and the lower surface of plunger 56 likewise to be brought into intimate contact. The surfaces are pressed together by a force substantially equal to the entire load of the valve operating gear at the time of opening of the engine valve. The leak-down rate between the plunger and separate cylinder is controlled by the lower surface of the plunger 56 and the upper surface of the washer 57, one of the surfaces either being grooved as indicated at 32 in the construction shown in Fig. 1 or one or more of these surfaces being left in a sufficiently roughened condition, not polished, to provide the proper leak-down rate between the plunger and the separate cylinder. In this construction the elastic but substantially incompressible element is substantially confined by the washer 57, separate cylinder 44, the packing retainer washer 61 and the oil or other liquid medium within the hydraulic compression chamber 64. Thus the elastic packing element 60 affords substantially the same effect in producing a seal and a lagging or retardation of movement of the plunger with reference to the separate cylinder during operation as in the previously described constructions. The ball valve 53 is gravity and inertia actuated as well as by differential fluid pressures to cause its return to and maintenance in seated position during lift of the tappet.

Figure 7:
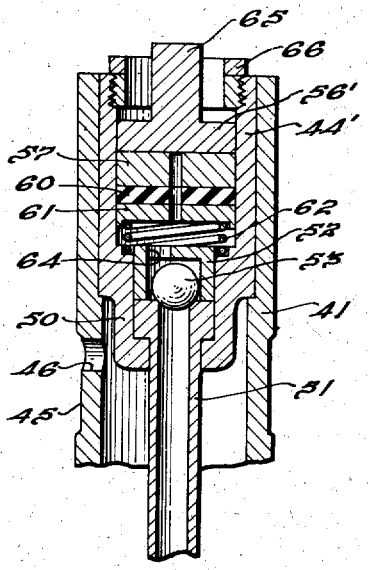

Referring to Fig. 7, a tappet very similar in construction to that shown in Fig. 6 is illustrated. In this construction the plunger 56', corresponding to the plunger 56 of the previously described embodiment is provided with a reduced end portion 65 adapted to contact a valve stem or other valve operating part for an exhaust or intake valve of an internal combustion engine. An abutment sleeve 66 is threaded to the upper end of the separate cylinder 44', corresponding to the separate cylinder 44 of the previously described embodiment, and the abutment sleeve 66 is spaced a considerable distance from the reduced portion 65 of plunger 56'. The abutment sleeve 66 limits outward movement of the plunger with reference to a separate cylinder so that in the event that an engine valve becomes stuck in open position the plunger cannot follow the stuck valve a sufficient distance to cause breakage of the latter or of the cylinder head of the engine. The remaining parts shown in Fig. 7 correspond with like parts shown in Fig. 6 and are given the same numerals.

Figure 8:
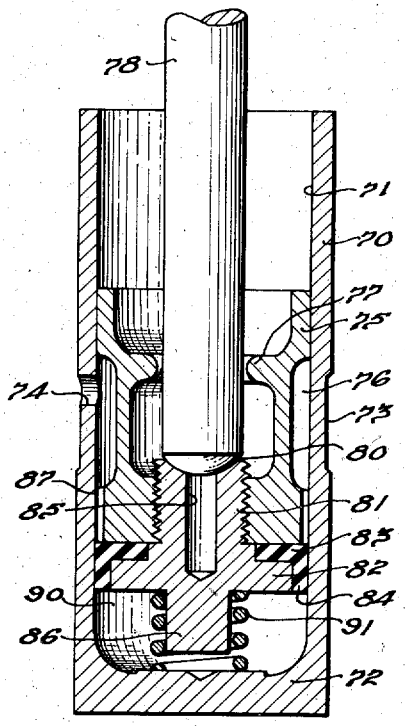

Reference may now be had to Fig. 8 which discloses a further modified form of tappet construction. This construction includes a cylindrical body portion 70 provided with a longitudinal bore 71 and a closed end 72 and is further provided with an annular recess 73 and one or more liquid admission ports 74. A substantially hollow plunger 75 is received in the bore 71 of tappet body 70. The plunger 75 is provided with an annular recess 76 which communicates through port 74 with the annular recess 73 so that liquid under pressure or oil from the lubricating system of internal combustion engine may be supplied to the annular recess 76 which constitutes the preliminary or reserve oil supply chamber of the tappet. This tappet construction is designed primarily for overhead type of engine valves and the cylinder 75 is provided with an inwardly directed flange 77 for guiding a push rod, indicated at 78, and preventing the latter from jumping its seat. A substantially spherical seat 80 is provided at the upper end of a threaded member 81 which is threaded into the lower end of plunger 75 and provided with a head portion 82 adapted to hold an elastic but substantially incompressible packing element 83 in assembled relation with reference to the plunger 75. The packing element 83 is downwardly flanged as indicated at 84 at the outer periphery thereof. The seat member 81 is axially bored as indicated at 85 for lightness. The seat member 81 is also provided with a downwardly directed boss portion 86 adapted to contact the lower closed end 72 of the tappet body 71 in the event of failure of oil supply so that after oil in the preliminary or reserve supply chamber 76 has been exhausted, the tappet will still cause operation of the engine valve although with some lift loss. Axially directed peripheral passages 87 are provided at the lower end of the plunger 75 for permitting passage of oil or other liquid under pressure past the lower end of the piston from the preliminary or reserve liquid supply chamber 76 to the hydraulic compression chamber 90 formed by that portion of the bore 71 between the plunger 75 and the lower closed end 72 of the tappet body 70. A plunger spring 91 is disposed about the boss portion 86 and is compressed from free length by an amount only slightly more than is needed for compensation purposes so that the plunger will not follow a stuck engine valve a sufficient distance to cause breakage by forcing the latter into a cylinder a sufficient distance to cause breakage of the valve or of an engine piston. The opposite ends of the plunger spring 91 abut the seat member 81 and the lower closed end 72 of tappet body 70 in order to force the plunger 75 outwardly with reference to the tappet body for compensation purposes.

Liquid under pressure or oil from the lubricating system of the engine is admitted to the annular recess 73 and inlet port 74 through the preliminary or reserve supply chamber 76. The plunger spring 91 forces the plunger 75 outwardly until the seat 80 is in contact with the lower end of the push rod 78, and the closed end 72 is brought into contact with the operating cam of the engine valve operating mechanism. Any movement of the plunger 75 outwardly with reference to the tappet body 70 creates a partial vacuum condition within the hydraulic compression chamber 90 and relaxes the pressure on the lower end of the elastic but substantially incompressible packing element 83 allowing oil or other liquid to pass from the preliminary or reserve supply chamber 76 through the peripheral grooves or passages 87 and past the elastic packing 83 to the hydraulic compression chamber 90. As the valve operating cam starts to lift the tappet increased pressures within the hydraulic compression chamber act on the lower surface of the downwardly directed flanged portion 84 of the elastic packing 83 and cause a flowing of the material of the elastic packing until the outer periphery thereof is brought into sealing relation with the bore 71 of tappet body 70. Thus in the present construction the elastic packing not only serves to provide a seal between the plunger and the bore of the tappet body but also provides a non-return valve controlling the admission of oil or other liquid under pressure to the hydraulic compression chamber. The elastic but substantially incompressible packing 83 is substantially confined by the plunger 75, the head portion 82 of the seat member 81, the wall of the bore 71 of tappet body 70 and the oil or other liquid in hydraulic compression chamber 90 so that the elastic packing 83 affords the same sealing effect and a lagging or retardation of movement of the plunger relative to the tappet body as in the previously described embodiments.

Reference may now be had to Fig. 9 which discloses a tappet body 100 provided with an axially directed bore 101 and closed at its lower end indicated at 102. The tappet body 100 is provided with a peripheral recess 103 and one or more admission ports 104 leading to an annular recess 105 cut into the wall portion of the tappet body 100 from the bore 101 thereof. The recess 105 forms a part of the preliminary or reserve oil or liquid supply chamber of the tappet construction. Within the bore 101 are disposed a pair of pressed metal cup-like members 106 and 107, the member 106 being arranged in inverted position so that the open ends of the cup-like members face one another. The cup-like member 106 constitutes a part of the plunger of the tappet construction while the cup-like member 107 forms the separate cylinder. A stem member 108 is riveted to the bottom of the inverted cup-shaped member 106 as indicated at 110 and forms a part of the plunger structure. The stem member 108 is provided with a flange 111, the lower face of which is disposed in a plane transverse to the axis of the stem member 108. The stem member 108 carries a washer-like valve member 112 and a washer-like elastic but substantially incompressible packing element 113 loosely secured in working position by means of a retaining washer 114 pressed into the lower reduced end of stem 108. The tappet body 100 is provided with an annular recess 115 outside the bottom portion of the cup-like separate cylinder 107 and this recess communicates through the openings 116 to the exterior periphery of the tappet body, the openings 116 being adapted to drop partially below the lower end of the tappet guide for ventilation purposes and for lightening the tappet construction. In the event of failure of the oil supply, the lower end of the stem 108 will abut the bottom of the separate cylinder member 107 after the liquid or oil in the preliminary chamber 105 has been exhausted so that the tappet will continue to lift the engine valve, although with some lift loss. A plunger spring 117 engages suitable recesses in the inner peripheral surfaces of the open ends of the cup-like members 106 and 107 to extend the plunger outwardly with reference to the tappet 100. The preliminary or reserve supply chamber for oil or liquid comprises a recess 105, the hollow interior of the cup-like plunger 106 not occupied by the stem 108, the portion of the hollow interior of the cup-like separate cylinder 107 lying above the flange 111 on stem 108 and valve member 112 and the space within the bore 101 lying between the plunger and separate cylinder not occupied by the stem 108 and the spring 117. As in the previously described embodiment, the plunger spring 117 tends to extend the plunger 106 outwardly with reference to the tappet body until the upper end of the plunger contacts a valve operating part while the lower end of the tappet body 100 contacts another valve operating part. This tends to create a partial vacuum condition within the hydraulic compression chamber 120 located in the bottom portion of the separate cylinder 107 so that the superior oil pressure within the reserve supply chamber 105 will force the valve member 112 from its seat and cause flow of oil or other liquid under pressure from the reserve or preliminary chamber and into the hydraulic compression chamber until the pressure within the chambers are substantially equalized. As the engine valve operating cam lifts the tappet, the increased pressure within the hydraulic compression chamber 120 acts upon the lower face of the packing element 113 and upon its inner periphery to flow the material of the packing element outwardly against the bore of the separate cylinder 107 thus sealing the packing element with reference to the separate cylinder and with reference to valve member 112. The pressure against the lower surface of the packing element 113 forces the valve member 112 upwardly against the flange 111 so that nearly a complete seal is established between the valve member 112 and flange member 111. One or the other of the cooperating surfaces of the flange 111 and valve member 112 are either grooved as indicated in the embodiment shown in Figs. 1 and 5 or left in a slightly roughened condition until the proper leak-down rate is obtained between these elements in order to compensate for the lengthening of valve operating parts due to expansion under heat. In this construction the unit comprising the plunger, plunger spring and separate cylinder structure and contained parts is reversible in the tappet body so that the tappet can also be employed in conjunction with an overhead valve operating cam shaft. In the construction shown in Fig. 9, because the sealing element 113 has substantially only enough movement on the plunger 108 to open the valve forming surfaces to permit flow of oil to the compression chamber 120, the lagging or retardation in movement of the sealing element 113 due to its frictional engagement with the bore of the member 107 when forces tending to shorten the tappet are relieved, will retard any tendency of the plunger 108 to move upwardly a material distance under the influence of the spring 117. Also, if desired, a Sylphon bellows may be used in place of the plunger spring 117 for a self-contained tappet.

In the construction shown in Fig. 9 such elements as a plain washer and a packing spring washer and packing spring 17 and 18 of the embodiment shown in Figs. 1 and 5 are omitted. In the construction shown in Figs. 1 and 5, essentially the same valve and sealing element construction should be employed as in the case of the embodiment shown in Fig. 9.

In the embodiment illustrated in Fig. 9 the valve element 112 is provided with a passage 121 extending therethrough in an axial direction so that when the pressure is relieved in the hydraulic compression chamber 120, the valve element may be readily separated from the flange 111 and from the sealing element 113 in order to readily effect a cleaning cycle when the engine valve is on its seat. A vent opening 122 is bored through the wall of the plunger element 106 near the upper end thereof to prevent trapping of substantial quantites of air or gas within the hollow interior of the plunger 106.

In all of the illustrated embodiments, the preliminary or reserve air separation chamber is vented to atmosphere either through clearance between the plunger and the bore of the tappet body as in the embodiment shown in Figs. 1 to 5, 8 and 9 or through clearance between the separate cylinder and the bore of the tappet body as in the case of the embodiment shown in Figs. 6 and 7. The elastic packing elements are forced radially outwardly by flowing the material thereof in that direction in order to seal the plunger with reference to its cylinder, but when the engine valve is on its seat to permit air or gas to flow by gravity from the highest point of the hydraulic compression chamber past the plunger to the preliminary or reserve chamber in the embodiments shown in Figs. 1 to 5, 8 and 9 or directly to atmosphere in the embodiments shown in Figs. 6 and 7. In each of the illustrated embodiments provision is made for limiting travel inwardly of the plunger so that operation of the engine valve will be had, although with some lift loss, in the event of failure of oil supply and after oil in the preliminary or reserve supply chamber has been exhausted. In the embodiment shown in Figs. 1 and 5, the lower end of the plunger 12 or the element 36 abuts the closed end 23 for limiting inward movement of the plunger with reference to the tappet body. In the embodiment shown in Figs. 6 and 7 the plunger and elements carried thereby have but a limited movement inwardly with reference to the separate cylinders 44 or 44'. In the construction shown in Fig. 8 the boss portion 86 and in the embodiment shown in Fig. 9 the lower end of the stem member 108 serve the same ends.

The specific application of a lead or other soft metal and therefore ductile packing washer in a tappet of the construction herein described forms the subject-matter of our United States Letters Patent No. 2,227,288, issued December 31, 1940, for improvements in Tappet construction, the same being a division of the original of this patent.

As many changes could be made in the above construction, and many apparently widely different embodiments of this construction could be had without departing from the scope thereof, it is intended that all matter contained in the above description or showing shall be interpreted as illustrative and not in a limiting sense.

What is claimed is:

1. In a valve tappet, the combination of a cylindrical body provided with a longitudinal bore, said body being closed at one end and open at the other, a plunger disposed in said bore and means including a yieldable but substantially incompressible element composed of rubber-like substance for causing a lagging or retardation in movement of said plunger relative to said cylindrical body when forces acting axially upon opposite ends of said tappet are changed.

2. In a hydraulic valve tappet, the combination of a cylindrical body provided with a longitudinal bore, said body being closed at one end and open at the other, a plunger disposed in said bore and in conjunction with said cylindrical body defining a hydraulic compression chamber between the plunger and the closed end of said cylindrical body, means for admitting liquid into said cylindrical body, and resilient means for extending said plunger outwardly with respect to said cylindrical body, of means including a yieldable but substantially incompressible element composed of rubber-like substance in a substantially confined condition for causing a lagging or retardation in movement of said plunger relative to said cylindrical body when forces acting axially upon opposite ends of said tappet are changed.

3. In a hydraulic valve tappet, the combination of a cylindrical body provided with a longitudinal bore, said body being closed at one end and open at the other, a plunger disposed in said bore and in conjunction with said cylindrical body defining a hydraulic compression chamber between the plunger and the closed end of said cylindrical body, means for admitting liquid to said cylindrical body, and resilient means for extending said plunger outwardly with respect to said cylindrical body, of means including a yieldable but substantially incompressible element composed of rubber-like substance substantially confined by said plunger, said hydraulic compression chamber and said cylindrical body for causing a lagging or retardation in movement of said plunger relative to said cylindrical body when forces acting axially upon opposite ends of said tappet are changed.

4. A hydraulic valve tappet, comprising a cylindrical body provided with a longitudinal bore, said body being closed at one end and open at the other, a plunger disposed in said bore and in conjunction with said cylindrical body defining a hydraulic compression chamber, means for admitting liquid into said cylindrical body and resilient means for extending said plunger outwardly with respect to said cylindrical body, said plunger including at one end a cylindrical guide portion making a free sliding fit in the bore of said cylindrical body, and valve means carried by the opposite end of said plunger and including a yieldable but substantially incompressible element shiftable axially of the plunger substantially confined by the plunger, cylindrical body and the hydraulic compression chamber for effecting a seal between said plunger and cylindrical body.

5. A hydraulic valve tappet, comprising a cylindrical body, provided with a longitudinal bore, said body being closed at one end and open at the other, a plunger disposed in said bore and in conjunction with said cylindrical body defining a hydraulic compression chamber, means for admitting liquid into said cylindrical body and resilient means for extending said plunger outwardly with respect to said cylindrical body, said plunger including an annular flange providing a plain surface normal to the axis of said plunger, a plain surface valve disc positioned to abut at one face thereof the plain surface of said flange to provide a check valve, the other plain surface of said valve disc being provided with a groove of small cross-section and extended length, a second plain surface disc positioned to abut the grooved surface of said valve disc to complete a small cross-section passage of relatively long length for limiting to a slight amount leakage from said hydraulic compression chamber, and a resilient but substantially incompressible element substantially confined by said plunger, cylindrical body and hydraulic compression chamber for effecting a seal between said plunger and cylindrical body.

6. In a hydraulic valve tappet, the combination with a cylindrical body provided with a longitudinal bore, said body being closed at one end and open at the other, a plunger disposed in said bore and in conjunction with said cylindrical body defining the hydraulic compression chamber between the plunger and the closed end of said cylindrical body, means for admitting liquid into said cylindrical body, and resilient means for extending said plunger outwardly with respect to said cylindrical body, of means including a flowable but substantially incompressible element for substantially preventing flow of liquid out of said hydraulic compression chamber and means loosely mounted on said plunger and providing for a definite and predetermined escapement of liquid out of said hydraulic compression chamber.

7. In a hydraulic valve tappet, the combination with a cylindrical body provided with a longitudinal bore, said body being closed at one end and open at the other, a plunger disposed in said bore and in conjunction with said cylindrical body defining the hydraulic compression chamber between the plunger and the closed end of said cylindrical body, means for admitting liquid into said cylindrical body, and resilient means for extending said plunger outwardly with respect to said cylindrical body, of means including a yieldable but substantially incompressible element providing a seal between the plunger and cylindrical body and substantially preventing flow of liquid out of said hydraulic compression chamber, and means loosely mounted on said plunger and providing for a definite and pre-determined escapement of liquid out of said hydraulic compression chamber.

8. In a hydraulic valve tappet, the combination with a cylindrical body provided with a longitudinal bore, said body being closed at one end and open at the other, a plunger disposed in said bore and in conjunction with said cylindrical body defining the hydraulic compression chamber between the plunger and the closed end of said cylindrical body, means for admitting liquid into said cylindrical body, and resilient means for extending said plunger outwardly with respect to said cylindrical body, of means including a washer-like element of yieldable but substantially incompressible material and providing a seal between the plunger and cylindrical body for substantially preventing flow of liquid out of said hydraulic compression chamber and means loosely mounted on said plunger and providing for a definite and predetermined escapement of liquid out of said hydraulic compression chamber.

9. In a hydraulic valve tappet, the combination with a cylindrical body provided with a longitudinal bore, said body being closed at one end and open at the other, a plunger disposed in said bore and in conjunction with said cylindrical body defining the hydraulic compression chamber between the plunger and the closed end of said cylindrical body, means for admitting liquid into said cylindrical body, and resilient means for extending said plunger outwardly with respect to said cylindrical body, of means including a washer-like element of yieldable but substantially incompressible material and providing a seal between the plunger and cylindrical body for substantially preventing flow of liquid out of said hydraulic compression chamber and means including a substantially rigid washer-like element provided with a small cross-sectioned groove in one face thereof extending from its inner to its outer periphery and a second substantially rigid washer-like element provided with a flat surface adapted to contact the grooved surface of said first named substantially rigid element providing for a definite and predetermined escapement of liquid out of said hydraulic compression chamber.

10. In a hydraulic valve tappet, the combination with a cylindrical body provided with a longitudinal bore and closed at one end, a plunger disposed in said bore and in conjunction with said cylindrical body defining a hydraulic compression chamber between the plunger and the closed end of said cylindrical body, of means including a flowable but substantially incompressible element for substantially preventing flow of liquid out of said hydraulic compression chamber, and means loosely mounted on said plunger and providing a definite and predetermined escapement of liquid out of said hydraulic compression chamber.

11. In a hydraulic valve tappet, the combination with a cylindrical body provided with a longitudinal bore, said body being closed at one end and open at the other, a plunger disposed in said bore and in conjunction with said cylindrical body defining a hydraulic compression chamber between the plunger and the closed end of said cylindrical body, means for admitting liquid into said cylindrical body, and resilient means for extending said plunger outwardly with respect to said cylindrical body, of valve means including a plurality of relatively movable parts movably mounted on said plunger for effecting a substantially complete seal between said plunger and said cylindrical body and for limiting to a definite and predetermined amount escape of liquid from said hydraulic compression chamber.

12. In combination, a hydraulic valve tappet interposed between an operating cam and an engine valve and comprising a cylindrical body provided with a longitudinal bore, said body being closed at one end and open at the other, a plunger disposed in said bore and in conjunction with said cylindrical body defining a hydraulic compression chamber between the plunger and the closed end of said cylindrical body, means for admitting liquid into said cylindrical body, resilient means for extending said plunger outwardly with respect to said cylindrical body, and valve means arranged between the means for admitting liquid into said cylindrical body and said hydraulic compression chamber, said valve means including means effecting a substantially complete seal between said plunger and said cylindrical body to prevent escape of liquid from said hydraulic compression chamber and including an imperfectly seating valve part providing for but limiting to a definite and predetermined amount, escape of liquid from said hydraulic compression chamber when the engine valve is open.

13. In a hydraulic valve tappet, the combination with a cylindrical body provided with a longitudinal bore, said body being closed at one end and open at the other, a plunger disposed in said bore and in conjunction with said cylindrical body defining a hydraulic compression chamber between the plunger and the closed end of said cylindrical body, means for admitting liquid into said cylindrical body, and resilient means for extending said plunger outwardly with respect to said body, of non-return valve means including a yieldable element of flowable but non-compressible material shiftable relative to the plunger, said yieldable element providing a seal between the plunger and cylindrical body and providing a portion of said non-return valve means, said non-return valve means permitting passage of liquid into said hydraulic compression chamber but substantially preventing flow of liquid out of said hydraulic compression chamber.

14. In a hydraulic valve tappet, the combination with a cylindrical body provided with a longitudinal bore, said body being closed at one end and open at the other, a plunger disposed in said bore and in conjunction with said cylindrical body defining a hydraulic compression chamber and a liquid supply chamber, means for admitting liquid into said cylindrical body, and means for extending said plunger outwardly with respect to said cylindrical body, of non-return valve means including a yieldable element of flowable but non-compressible material shiftable relative to the plunger, said yieldable element providing a seal between the plunger and cylindrical body and providing a portion of said non-return valve means, said non-return valve means permitting passage of liquid from said supply chamber to said compression chamber but substantially preventing flow of liquid from said compression chamber to said supply chamber.

15. In a hydraulic valve tappet, the combination with a cylindrical body provided with a longitudinal bore, said body being closed at one end and open at the other, a plunger disposed in said bore and in conjunction with said cylindrical body defining a hydraulic compression chamber between the plunger and the closed end of said cylindrical body, means for admitting liquid into said cylindrical body, and resilient means for extending said plunger outwardly with respect to said cylindrical body, of non-return valve means including a yieldable element, said yieldable element providing a seal between the plunger and cylindrical body and providing a portion of said non-return valve means, said non-return valve means permitting passage of liquid into said compression chamber but substantially preventing flow of liquid out of said compression chamber, said non-return valve means also including a pair of disc-like elements having abutting plain surfaces, one of such surfaces being provided with a groove of relatively small cross-sectional area but relatively long length for limiting to a slight amount leakage outwardly from the hydraulic compression chamber when said non-return valve means is closed.

16. In a hydraulic valve tappet, the combination with a cylindrical body provided with a longitudinal bore, said body being closed at one end and open at the other, a plunger disposed in said bore and in conjunction with said cylindrical body defining a hydraulic compression chamber and a liquid supply chamber, means for admitting liquid into said cylindrical body, and resilient means for extending said plunger outwardly with respect to said cylindrical body, of non-return valve means including a yieldable element, said yieldable element providing a seal between the plunger and cylindrical body and providing a portion of said non-return valve means, said non-return valve means permitting passage of liquid from said supply chamber to said compression chamber but substantially preventing return flow of liquid from said compression chamber to said supply chamber, said non-return valve means also including a pair of disc-like elements having abutting plain surfaces, one of such surfaces being provided with a groove of relatively small cross-sectional area and relatively long length for limiting to a small amount leakage from said hydraulic compression chamber to said liquid supply chamber when said non-return valve means is closed.

17. In a hydraulic valve tappet, the combination with a cylindrical body provided with a longitudinal bore, said body being closed at one end and open at the other, a plunger disposed in said bore and in conjunction with said cylindrical body defining a hydraulic compression chamber between the plunger and the closed end of said cylindrical body, means for admitting liquid into said cylindrical body and resilient means for extending said plunger outwardly with respect to said cylindrical body, of non-return valve means including a yieldable element, said yieldable element providing a seal between the plunger and cylindrical body and providing a portion of said non-return valve means, said non-return valve means permitting passage of liquid into said hydraulic compression chamber but substantially preventing return flow of liquid out of said compression chamber, said means including a washer-like element provided with a plain surface in which is formed a small cross-sectional groove extending spirally from its inner to its outer periphery for limiting to a slight amount leakage from said hydraulic compression chamber when said non-return valve means is closed.

18. In a hydraulic valve tappet, the combination with a cylindrical body provided with a longitudinal bore, said body being closed at one end and open at the other, a plunger disposed in said bore and in conjunction with said cylindrical body defining a hydraulic compression chamber and a liquid supply chamber, means for admitting liquid into said cylindrical body, and resilient means for extending said plunger outwardly with respect to said cylindrical body, of non-return valve means including a yieldable element, said yieldable element providing a seal between the plunger and cylindrical body and providing a portion of said non-return valve means, said non-return valve means permitting passage of liquid from said supply chamber to said hydraulic compression chamber but substantially preventing return flow of liquid from said hydraulic compression chamber to said supply chamber, said means also including a washer-like element provided with a plain surface in which is formed a small cross-sectioned groove extending spirally from its inner to its outer periphery for limiting to a slight amount leakage from said hydraulic compression chamber to said liquid supply chamber when said non-return valve means is closed.

19. In combination, a hydraulic valve tappet interposed between an operating cam and an engine valve and comprising a cylindrical body provided with a longitudinal bore, said body being closed at one end and open at the other, a plunger disposed in said bore and in conjunction with said cylindrical body defining a hydraulic compression chamber between the plunger and the closed end of the cylindrical body, means for admitting liquid into said cylindrical body, and resilient means for extending said plunger outwardly with respect to said cylindrical body, of check valve means for controlling the flow of liquid to and from said hydraulic compression chamber, said check valve means including a yieldable but substantially incompressible valve element shiftable relative to the plunger arranged in a substantially confined condition by said piston, said cylindrical body, and the liquid in said hydraulic compression chamber, said valve element having an outside diameter substantially equal to that of said plunger.

20. In a valve tappet, the combination of a cylindrical body provided with a longitudinal bore, said body being closed at one end and open at the other, means including a yieldable but substantially incompressible element composed of rubber-like substance slidably received in said bore and forming a compression chamber between it and the closed end of said bore, and means constantly urging the first mentioned means in a direction to enlarge the volume of said compression chamber, said element frictionally engaging the wall of said bore whereby to cause a lagging or retardation in the movement thereof outwardly of said bore under the influence of the second mentioned means during operation.

21. In an hydraulic tappet, the combination of a pair of relatively movable members defining a compression chamber, sealing means for said chamber, one of said members having a passage admitting fluid to said chamber, and an imperfectly seating valve means co-operating with said passage movable between an opened and a partially closed condition, said valve means being opened for relatively free flow during inflow of fluid thereto and partially closed because of its imperfect seating for relatively restricted flow during outflow therefrom.

22. In an hydraulic tappet, the combination of a pair of relatively movable members defining a compression chamber, sealing means for said chamber, at least one of said members being provided with a passage admitting flow of fluid to and from said chamber, and imperfectly seating valve means adapted to open said passage for relatively free flow of fluid and to partially close the same for relatively restricted flow, said valve means opening said passage for relatively free inflow of fluid thereto during expansion of said chamber and partially closing said passage for relatively restricted outflow therefrom during compression of said chamber.

23. In a valve tappet, the combination of a cylindrical body provided with a longitudinal bore, said body being closed at one end and open at the other, a plunger assembly slidably disposed in said bore and providing a compression chamber between it and the closed end of said bore, said assembly being provided with a passage therein for the flow of oil into and out of said compression chamber, and imperfectly seating valve means for controlling the flow of oil through said passageway, said valve means permitting substantially free flow of oil through said passageway to said compression chamber and permitting a restricted flow of oil through said passageway from said compression chamber.

24. In a valve tappet, the combination of a cylindrical body provided with a longitudinal bore, said body being closed at one end and open at the other, a plunger assembly slidably disposed in said bore and providing a compression-chamber between it and the closed end of said bore, said assembly being provided with a passage therein for the flow of oil into and out of said compression chamber, and an imperfectly seating valve means for controlling the flow of oil both to and from said compression chamber through said passageway.

25. In a valve tappet, the combination of a cylindrical body provided with a longitudinal bore, said body being closed at one end and open at the other end, a plunger slidably received in said bore, means including a yieldable but substantially incompressible element cooperating with said plunger to form a compression chamber between it and the closed end of said bore and urged toward equal movement with said plunger, and resilient means normally urging said plunger outwardly of said bore under operating conditions, said element frictionally engaging the wall of said bore whereby to cause a lagging or retardation in the movement thereof when urged outwardly of said bore with said plunger, whereby to retard the speed of enlargement of said compression chamber under the influence of said resilient means.

CARL VOORHIES.
HARRY E. VOORHIES.